US011643066B2

(12) United States Patent
Ramakrishnan et al.

(10) Patent No.: US 11,643,066 B2
(45) Date of Patent: May 9, 2023

(54) SYSTEMS AND METHODS FOR POWER MANAGEMENT USING ADAPTIVE POWER SPLIT RATIO

(71) Applicant: Cummins Inc., Columbus, IN (US)

(72) Inventors: Kesavan Ramakrishnan, Columbus, IN (US); Vaidehi Y. Hoshing, Columbus, IN (US)

(73) Assignee: UNITED STATES DEPARTMENT OF ENERGY, Washington, DC (US)

( * ) Notice: Subject to any disclaimer, the term of this patent is extended or adjusted under 35 U.S.C. 154(b) by 189 days.

(21) Appl. No.: 16/918,481

(22) Filed: Jul. 1, 2020

(65) Prior Publication Data

US 2022/0001850 A1  Jan. 6, 2022

(51) Int. Cl.
*B60W 20/16* (2016.01)
*B60W 10/06* (2006.01)
*B60W 10/08* (2006.01)
*F01N 11/00* (2006.01)
*G01C 21/34* (2006.01)

(52) U.S. Cl.
CPC ............ *B60W 20/16* (2016.01); *B60W 10/06* (2013.01); *B60W 10/08* (2013.01); *F01N 11/002* (2013.01); *G01C 21/3461* (2013.01); *B60W 2510/244* (2013.01); *B60W 2510/246* (2013.01)

(58) Field of Classification Search
CPC ...... B60W 20/24; B60W 20/12; B60W 20/11; B60W 20/16; B60W 20/10; B60W 20/13; B60W 10/06; B60W 10/08; B60W 2510/244; B60W 2510/246; B60W 2710/0677; B60W 2710/086; F01N 11/002; G01C 21/3461
See application file for complete search history.

(56) References Cited

U.S. PATENT DOCUMENTS

| 6,484,833 | B1* | 11/2002 | Chhaya | B60K 6/44 180/65.225 |
|---|---|---|---|---|
| 7,360,615 | B2 | 4/2008 | Salman | |
| 8,151,916 | B2 | 4/2012 | Gearhart | |
| 8,190,318 | B2 | 5/2012 | Li | |
| 8,825,243 | B2 | 9/2014 | Yang | |
| 9,248,825 | B2 | 2/2016 | King | |
| 2010/0043414 | A1* | 2/2010 | Hirose | B60W 20/15 903/904 |
| 2012/0245762 | A1 | 9/2012 | Fassnacht | |
| 2015/0006000 | A1 | 1/2015 | Kawata | |

(Continued)

FOREIGN PATENT DOCUMENTS

GB    2487733 A    8/2012
WO    2018104850 A1    6/2018

*Primary Examiner* — George C Jin
(74) *Attorney, Agent, or Firm* — Faegre Drinker Biddle & Reath LLP (57) ABSTRACT

Methods and systems of power management in a hybrid vehicle are disclosed. A control system of the hybrid vehicle obtains battery temperature and catalyst temperature. The control system determines (a) whether the battery temperature is within an optimal battery temperature range and (b) whether the catalyst temperature is within an optimal catalyst temperature range. The control system determines a power split ratio (PSR) based on the determination of (a) and (b). The control system controls the engine and the motor-generator based on the determined PSR.

25 Claims, 6 Drawing Sheets

(56) References Cited

U.S. PATENT DOCUMENTS

| | | |
|---|---|---|
| 2017/0320481 A1 | 11/2017 | Johannesson Mardh |
| 2018/0148040 A1* | 5/2018 | Kamatani .............. B60K 6/445 |
| 2019/0271253 A1* | 9/2019 | Hirooka ................ B60W 10/26 |
| 2020/0361444 A1* | 11/2020 | Sujan ...................... F01N 11/00 |

* cited by examiner

SYSTEMS AND METHODS FOR POWER MANAGEMENT USING ADAPTIVE POWER SPLIT RATIO

GOVERNMENT SUPPORT CLAUSE

This invention was made with Government support under Award Number(s) DE-AC02-06CH11357 awarded by the Department of Energy. The Government has certain rights in this invention.

FIELD OF THE DISCLOSURE

The present disclosure relates generally to vehicles, especially to power management of hybrid vehicles having an electrical motor and a fuel-powered engine.

BACKGROUND OF THE DISCLOSURE

A hybrid power generation system may include a hybrid control system, a battery, a motor-generator, and an engine (e.g., a diesel engine). A control system of the hybrid vehicle may direct the battery and/or the engine/motor-generator to provide power to move the vehicle. Additionally, in some instances, the engine/motor-generator may also provide power to recharge the battery. For instance, currently, when a state of charge (SOC) for the battery is below a minimum charging threshold, the control system may direct the engine/motor-generator to recharge the battery up to a charging threshold. As such, power management strategies of the hybrid vehicle may incorporate using the motor-generator and the engine effectively for more options than when only one or the other is implemented.

However, existing power management strategies focus on meeting emission and fuel economy targets without considering the states of the individual components. For example, to reduce the emission, the motor-generator may be used more frequently than the engine, but the battery's performance is derated when the operating temperatures are above the pre-set thresholds. Also, over time, the battery may degrade. For example, initially, a battery may last eight hours under normal usage. But, over time and due to the battery's degradation, the battery might last only four hours. Additionally, and/or alternatively, severe conditions, such as weather-related conditions and/or natural disasters, may cause more usage of a battery than normal. Furthermore, the life of the aftertreatment catalyst may be affected adversely due to constant operation at very high temperatures. As such, it may be desirable to develop a hybrid control system that can effectively use the hybrid components (both the engine and the motor-generator) to eliminate or alleviate one or more operational disadvantages described above.

SUMMARY

Various embodiments of the present disclosure relate to methods of power management in a hybrid vehicle. The hybrid vehicle may include an engine, a motor-generator, an aftertreatment system operatively coupled to the engine, a battery operatively coupled to the motor-generator, and a control system. The method includes obtaining, by the control system, battery temperature and catalyst temperature. The control system determines (a) whether the battery temperature is within an optimal battery temperature range and (b) whether the catalyst temperature is within an optimal catalyst temperature range. The control system determines a power split ratio (PSR) based on the determination of (a) and (b). The control system controls the engine and the motor-generator based on the determined PSR.

In some examples, the control system decreases the PSR when the catalyst temperature is lower than the optimal catalyst temperature range. In some examples, the PSR decrease is based on a rate at which the battery temperature or the catalyst temperatures changes and/or a rate at which the state of charge of the temperature changes.

In some examples, the control system decreases the PSR when the catalyst temperature is within or lower than the optimal catalyst temperature range and the battery temperature is higher than the optimal battery temperature range. In some examples, the control system increases the PSR when the battery temperature is lower than the optimal battery temperature range and the catalyst temperature is within or higher than the optimal catalyst temperature range. In some examples, the control system increases the PSR when the catalyst temperature is higher than the optimal catalyst temperature range and the battery temperature is within or lower than the optimal battery temperature range.

In some examples, the control system obtains geofencing data and determines whether the vehicle is in or approaching a lower-emission zone based on the geofencing data. Then, the control system sets the PSR at 1 when the vehicle is in or approaching the lower-emission zone. In some examples, the control system obtains lookahead data and determines the PSR based on the lookahead data. The lookahead data may include current or forward route condition. In some examples, the control system maintains the PSR when the catalyst temperature and the battery temperature are both within or higher than the respective optimal temperature ranges.

Also disclosed herein are hybrid vehicle systems with an engine, a motor-generator, an aftertreatment system operatively coupled to the engine, a battery operatively coupled to the motor-generator, and a control system which obtains battery temperature and catalyst temperature, determines (a) whether the battery temperature is within an optimal battery temperature range and (b) whether the catalyst temperature is within an optimal catalyst temperature range, determines a power split ratio (PSR) based on the determination of (a) and (b), and controls the engine and the motor-generator based on the determined PSR.

In some examples, the control system is further configured to decrease the PSR when the catalyst temperature is lower than the optimal catalyst temperature range. In some examples, the control system is further configured to decrease the PSR based on a rate at which the battery temperature or the catalyst temperatures changes. In some examples, the control system is further configured to decrease the PSR when the catalyst temperature is within or lower than the optimal catalyst temperature range and the battery temperature is higher than the optimal battery temperature range. In some examples, the control system is further configured to increase the PSR when the battery temperature is lower than the optimal battery temperature range and the catalyst temperature is within or higher than the optimal catalyst temperature range. In some examples, the control system is further configured to increase the PSR when the catalyst temperature is higher than the optimal catalyst temperature range and the battery temperature is within or lower than the optimal battery temperature range.

In some examples, the hybrid vehicle system further includes a telematics unit such that the control system obtains geofencing data from the telematics unit, determines whether the vehicle is in or approaching a lower-emission zone based on the geofencing data and sets the PSR at 1 when the vehicle is in or approaching the lower-emission zone. In some examples, the control system obtains lookahead data from the telematics unit and determines the PSR based on the lookahead data. The lookahead data may include current and/or forward route condition.

Also disclosed herein are control systems of a hybrid vehicle that includes an engine, a motor-generator, a battery operatively coupled to the motor-generator, and a control system. The control system is operable to obtain battery temperature and catalyst temperature, determine whether the battery temperature is within a predetermined optimal battery temperature range, determine whether the catalyst temperature is within a predetermined optimal catalyst temperature range, determine a power split ratio (PSR) based on the determination of the battery temperature, catalyst temperature, the rate of change of these temperatures, and a rate of change of state of charge (SOC) of the battery, and control the engine and the motor-generator based on the determined PSR.

While multiple embodiments are disclosed, still other embodiments of the present disclosure will become apparent to those skilled in the art from the following detailed description, which shows and describes illustrative embodiments of the disclosure. Accordingly, the drawings and detailed description are to be regarded as illustrative in nature and not restrictive.

BRIEF DESCRIPTION OF THE DRAWINGS

The above-mentioned and other features and advantages of this disclosure, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. The exemplifications set out herein illustrate exemplary embodiments of the disclosure and such exemplifications are not to be construed as limiting the scope of the disclosure in any manner. While the present disclosure is amenable to various modifications and alternative forms, specific embodiments have been shown by way of example in the drawings and are described in detail below. The intention, however, is not to limit the present disclosure to the particular embodiments described. On the contrary, the present disclosure is intended to cover all modifications, equivalents, and alternatives falling within the scope of the present disclosure as defined by the appended claims.

DETAILED DESCRIPTION OF THE DISCLOSURE

In the following detailed description, reference is made to the accompanying drawings which form a part hereof, and in which is shown by way of illustration specific embodiments in which the present disclosure is practiced. These embodiments are described in sufficient detail to enable those skilled in the art to practice the present disclosure, and it is to be understood that other embodiments can be utilized and that structural changes can be made without departing from the scope of the present disclosure. Therefore, the following detailed description is not to be taken in a limiting sense, and the scope of the present disclosure is defined by the appended claims and their equivalents.

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments. Furthermore, the described features, structures, or characteristics of the subject matter described herein may be combined in any suitable manner in one or more embodiments.

For the purposes of promoting an understanding of the principles of the present disclosure, reference is now made to the embodiments illustrated in the drawings, which are described below. The exemplary embodiments disclosed herein are not intended to be exhaustive or to limit the disclosure to the precise form disclosed in the following detailed description. Rather, these exemplary embodiments were chosen and described so that others skilled in the art may utilize their teachings.

The terms "couples," "coupled," and variations thereof are used to include both arrangements wherein two or more components are in direct physical contact and arrangements wherein the two or more components are not in direct contact with each other (e.g., the components are "coupled" via at least a third component), but yet still cooperate or interact with each other. Furthermore, the terms "couples," "coupled," and variations thereof refer to any connection for machine parts known in the art, including, but not limited to, connections with bolts, screws, threads, magnets, electro-magnets, adhesives, friction grips, welds, snaps, clips, etc.

Throughout the present disclosure and in the claims, numeric terminology, such as first and second, is used in reference to various components or features. Such use is not intended to denote an ordering of the components or features. Rather, numeric terminology is used to assist the reader in identifying the component or features being referenced and should not be narrowly interpreted as providing a specific order of components or features.

Figure 1:
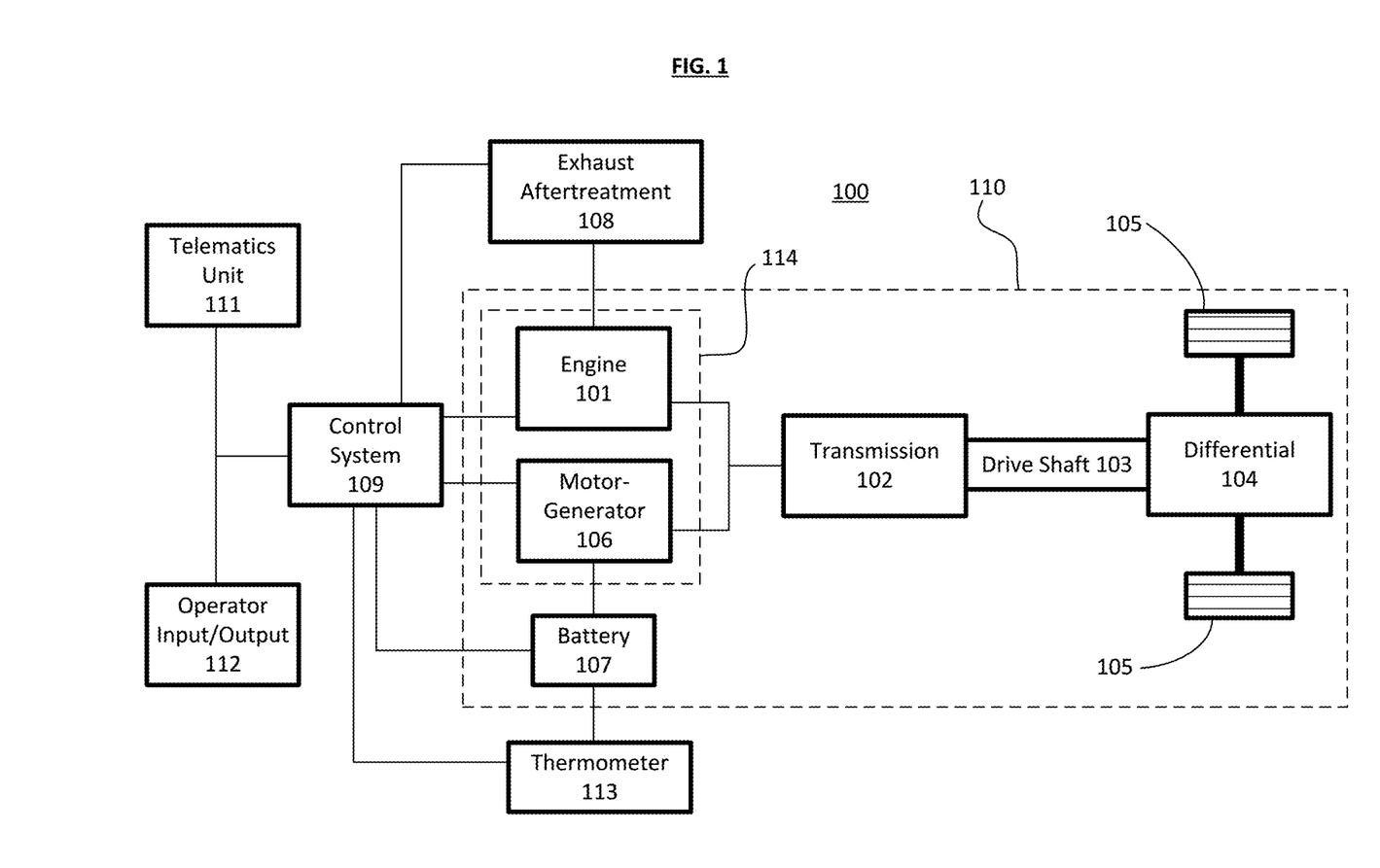
FIG. 1 is a schematic diagram of a hybrid vehicle according to some embodiments.

FIG. 1 shows a vehicle system 100 that includes an engine power source 101, which may be an internal combustion engine for example, and a motor-generator 106 power source in parallel hybrid vehicles. The vehicle 100 may be configured as any type of hybrid-powered vehicle (e.g., a series hybrid electric vehicle, a strong parallel hybrid electric vehicle, a mild parallel hybrid electric vehicle, etc.). As such, the vehicle 100 may be configured as a plugin or non-plugin and an on-road or an off-road vehicle including, but not limited to, line-haul trucks, mid-range trucks (e.g., pick-up truck), tanks, airplanes, off-highway equipment such as mining equipment, etc. The various components of the vehicle 100 may be described as follows. The vehicle 100 is shown to generally include a powertrain system 110, an exhaust aftertreatment system 108, and a control system 109, where the control system 109 is communicably coupled to each of the engine 101, the exhaust aftertreatment system 108 operatively coupled with the engine 101, the motor-generator 106, and a battery 107 operative coupled with the motor-generator 106. An inverter is omitted from the figure for simplicity, but it is understood that an inverter can be placed between the motor-generator 106 and the battery 107 to convert between alternating current (AC) and direct current (DC). In some examples, the vehicle 100 may also include telematics systems to facilitate exchange of information or data in an intelligent transportation system (ITS).

The powertrain system 110 facilitates power transfer from the engine 101 and/or motor-generator 106 to power and/or propel the vehicle 100. The powertrain system 110 includes an engine 101 and a motor-generator 106 operably coupled to a transmission 102 that is operatively coupled to a drive shaft 103, which is operatively coupled to a differential 104, where the differential 104 transfers power output from the engine 101 and/or motor-generator 106 to the final drive (shown as wheels 105) to propel the vehicle 100. In this regard, the powertrain system 110 is structured as an electrified powertrain. The electrified powertrain includes the motor-generator 106, where the motor-generator 106 may include a torque assist feature, a regenerative braking energy capture ability, a power generation ability, and any other feature of motor-generators used in hybrid vehicles. In this regard, the motor-generator 106 may be any conventional motor-generator that is capable of generating electricity and producing a power output to drive the transmission 102. The motor-generator 106 includes a power conditioning device such as an inverter and motor control system. The electrified powertrain may also include any one or more of several electrified accessories including, but not limited to, an electrically driven/controlled air compressor, an electrically driven/controlled engine cooling fan, an electrically driven/controlled heating venting and air conditioning system, an alternator, etc., where the controllability may stem from the control system 109. It should be understood that the present disclosure contemplates any and all other types of electrically and mechanically powered accessories that may be a part of the powertrain system 110 and/or separate from the powertrain system 110 but included in the vehicle 100.

As a brief overview, the engine 101 receives a chemical energy input (e.g., a fuel such as gasoline or diesel) and combusts the fuel to generate mechanical energy, in the form of a rotating crankshaft. In comparison, the motor-generator 106 may be in a power receiving relationship with an energy source, such as battery 107 that provides an input energy (and stores generated electrical energy) to the motor-generator 106 for the motor-generator 106 to output in form of useable work or energy to in some instances propel the vehicle 100 alone or in combination with the engine 101. In this configuration, the hybrid vehicle 100 has a parallel drive configuration. However, it should be understood, that other configurations of the vehicle 100 are intended to fall within the spirit and scope of the present disclosure (e.g., a series configuration and non-hybrid applications, such as a full electric vehicle, etc.). As a result of the power output from at least one of the engine 101 and the motor-generator 106, the transmission 102 may manipulate the speed of the rotating input shaft (e.g., the crankshaft) to effect a desired drive shaft 103 speed. The rotating drive shaft 103 is received by a differential 104, which provides the rotation energy of the drive shaft 103 to the final drive 105. The final drive 105 then propels or moves the vehicle 100.

The engine 101 may be structured as any internal combustion engine (e.g., compression-ignition or spark-ignition), such that it can be powered by any fuel type (e.g., diesel, ethanol, gasoline, etc.). Similarly, although termed a "motor-generator" 106 throughout the pages of the disclosure, thus implying its ability to operate as both a motor and a generator, it is contemplated that the motor-generator component, in some embodiments, may be an electric generator separate from the electric motor of the hybrid vehicle 100. Furthermore, the transmission 102 may be structured as any type of transmission, such as a continuous variable transmission, a manual transmission, an automatic transmission, an automatic-manual transmission, a dual clutch transmission, etc. Accordingly, as transmissions vary from geared to continuous configurations (e.g., continuous variable transmission), the transmission can include a variety of settings (gears, for a geared transmission) that affect different output speeds based on the engine speed. Like the engine 101 and the transmission 102, the drive shaft 103, differential 104, and final drive 105 may be structured in any configuration dependent on the application (e.g., the final drive 105 is structured as wheels in an automotive application and a propeller in an airplane application). Further, the drive shaft 103 may be structured as a one-piece, two-piece, and a slip-in-tube driveshaft based on the application.

Moreover, the battery 107 may be configured as any type of rechargeable (i.e., primary) battery and of any size. That is to say, the battery 107 may be structured as any type of electrical energy storing and providing device, such as one or more capacitors (e.g., ultra-capacitors, etc.) and/or one or more batteries typically used or that may be used in hybrid vehicles (e.g., Lithium-ion batteries, Nickel-Metal Hydride batteries, Lead-acid batteries, etc.). The battery 107 may be operatively and communicably coupled to the control system 109 to provide data indicative of one or more operating conditions or traits of the battery 107. The data may include a temperature of the battery, a current into or out of the battery, a number of charge-discharge cycles, a battery voltage, etc. As such, the battery 107 may include one or more sensors coupled to the battery 107 that acquire such data. In this regard, the sensors may include, but are not limited to, voltage sensors, current sensors, temperature sensors, etc. In some examples, the sensors are part of a battery management system (BMS) which is operable with the control system 109 of the vehicle to monitor the state of the battery 107 as needed. In some examples, the BMS is implemented in the control system 109 as a battery monitoring module that receives and processes data from the sensors.

As also shown, the vehicle 100 includes an exhaust aftertreatment system 108 in fluid communication with the engine 101. The exhaust aftertreatment system 108 receives the exhaust from the combustion process in the engine 101 and reduces the emissions from the engine 101 to less environmentally harmful emissions (e.g., reduce the NOx amount, reduce the emitted particulate matter amount, etc.). The exhaust aftertreatment system 108 may include any component used to reduce diesel exhaust emissions, such as a selective catalytic reduction catalyst, a diesel oxidation catalyst, a diesel particulate filter, a diesel exhaust fluid doser with a supply of diesel exhaust fluid, and a plurality of sensors for monitoring the system 108 (e.g., a NOx sensor). It should be understood that other embodiments may exclude an exhaust aftertreatment system and/or include different, fewer, and/or additional components than that listed above. All such variations are intended to fall within the spirit and scope of the present disclosure.

The vehicle 100 is also shown to include a telematics unit 111. The telematics unit 111 may be structured as any type of telematics control unit. Accordingly, the telematics unit 111 may include, but is not limited to, a location positioning system (e.g., global positioning system) to track the location of the vehicle (e.g., latitude and longitude data, elevation data, etc.), one or more memory devices for storing the tracked data, one or more electronic processing units for processing the tracked data, and a communications interface for facilitating the exchange of data between the telematics unit 111 and one or more remote devices (e.g., a provider/manufacturer of the telematics device, etc.). In this regard, the communications interface may be configured as any type of mobile communications interface or protocol including, but not limited to, Wi-Fi, WiMax, Internet, Radio, Bluetooth, Zigbee, satellite, radio, Cellular, GSM, GPRS, LTE, and the like. The telematics unit 111 may also include a communications interface for communicating with the control system 109 of the vehicle 100. The communication interface for communicating with the control system 109 may include any type and number of wired and wireless protocols (e.g., any standard under IEEE 802, etc.). For example, a wired connection may include a serial cable, a fiber optic cable, an SAE J1939 bus, a CAT5 cable, or any other form of wired connection. In comparison, a wireless connection may include the Internet, Wi-Fi, Bluetooth, Zigbee, cellular, radio, etc. In one embodiment, a control system area network (CAN) bus including any number of wired and wireless connections provides the exchange of signals, information, and/or data between the control system 109 and the telematics unit 111. In other embodiments, a local area network (LAN), a wide area network (WAN), or an external computer (for example, through the Internet using an Internet Service Provider) may provide, facilitate, and support communication between the telematics unit 111 and the control system 109. In still another embodiment, the communication between the telematics unit 111 and the control system 109 is via the unified diagnostic services (UDS) protocol. All such variations are intended to fall within the spirit and scope of the present disclosure.

An operator input/output device 112 enables an operator of the vehicle to communicate with the vehicle 100 and the control system 109. For example, the operator input/output device 112 may include, but is not limited, an interactive display (e.g., a touchscreen, etc.), an accelerator pedal, a clutch pedal, a shifter for the transmission, a cruise control input setting, etc. Via the input/output device 112, the operator can designate preferred characteristics of one or more vehicle parameters. In some examples, the touchscreen may be part of a computing device or processing device that receives certain information from the operator, such as the destination of the vehicle 100, the expected mileage for a predetermined period of time, and/or the minimal distance to be traveled. A thermometer 113 that is operatively coupled with the battery 107 and the control system 109 allows for the control system 109 to receive data of how hot or cold the battery 107 is getting during the operation of the vehicle 100. Furthermore, the engine 101 and the motor-generator 106 define a genset 114 which is capable of charging the battery 107 by activating the engine 101 whose mechanical power is converted into electrical power via the motor-generator 106 and transferred to the battery 107.

Figure 2:
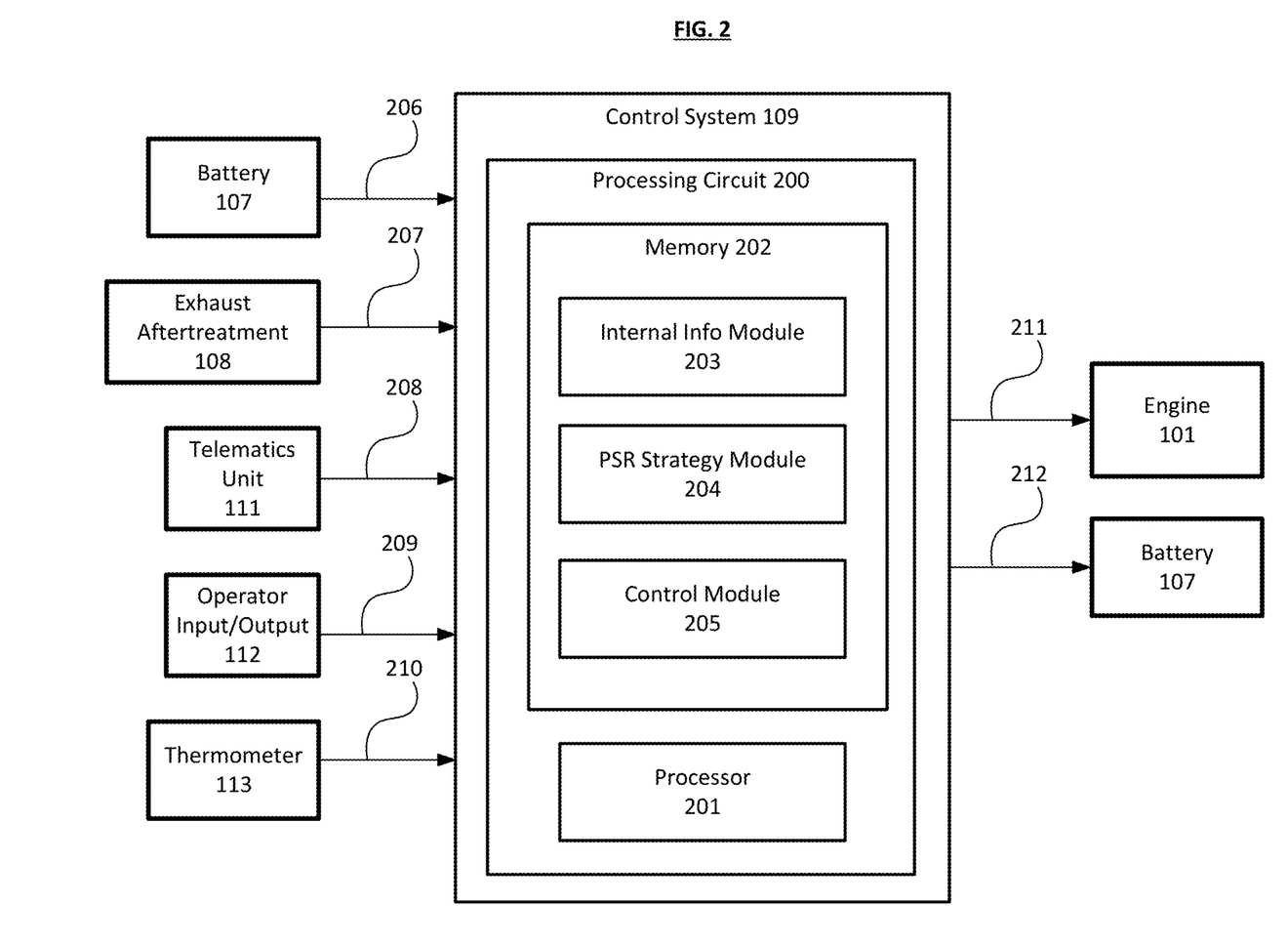
FIG. 2 is a schematic diagram of a control system used in the hybrid vehicle of FIG. 1 according to some embodiments.

FIG. 2 shows the function and structure of the control system 109, are shown according to one example embodiment. The control system 109 is shown to include a processing circuit 200 including a processor 201 and a memory 202. The processor 201 may be implemented as a general-purpose processor, an application specific integrated circuit (ASIC), one or more field programmable gate arrays (FPGAs), a digital signal processor (DSP), a group of processing components, or other suitable electronic processing components. The one or more memory devices 202 (e.g., NVRAM, RAM, ROM, Flash Memory, hard disk storage, etc.) may store data and/or computer code for facilitating the various processes described herein. Thus, the one or more memory devices 202 may be communicably connected to the control system 109 and provide computer code, or data, or instructions to the control system 109 for executing the processes described in regard to the control system 109 herein. Moreover, the one or more memory devices 202 may be or include tangible, non-transient volatile memory or nonvolatile memory. Accordingly, the one or more memory devices 202 may include database components, object code components, script components, or any other type of information structure for supporting the various activities and information structures described herein.

The memory 202 is shown to include various modules for completing the activities described herein. More particularly, the memory 202 includes an internal information module 203, a power split ratio (PSR) strategy module 204, and a control module 205. The internal information module 203 is a data-collection module that receives raw data from each of the components. The raw data may include one or more of the following: battery status data 206 such as the SOC of the battery 107, catalyst and/or emission data 207 such as catalyst temperature and onboard emission estimation as received from the exhaust aftertreatment system 108, GPS, geofencing, and/or lookahead data 208 as received from the telematics unit 111, operator's power demand and/or destination data 209 as received from the operator input/output device 112, and battery temperature data 210 as received from the thermometer 113. The lookahead data 208 may include current or forward route condition, for example.

Upon receiving the raw data using the internal information module 203, the PSR strategy module 204 calculates a target power level for the genset 114 and the battery 107, taking into consideration factors such as trip distance, battery SOC, catalyst and battery temperatures, onboard emission level, and GPS location, for example. In some examples, the raw data may be used in distance-to-destination calculation, vehicle route calculation, traffic estimation, etc. The control module 205 then uses the target power level calculated by the PSR strategy module 204 to send an engine control signal 211 to the engine 101 and a battery control signal 212 to the battery 107. For example, the engine control signal 211 may indicate whether to activate the engine 101 to use the genset 114 in providing electrical power to the battery 107, and the battery control signal 212 may control the battery to provide electrical power to the motor-generator 106 to move the vehicle 100 instead of the engine 101.

Figure 3:
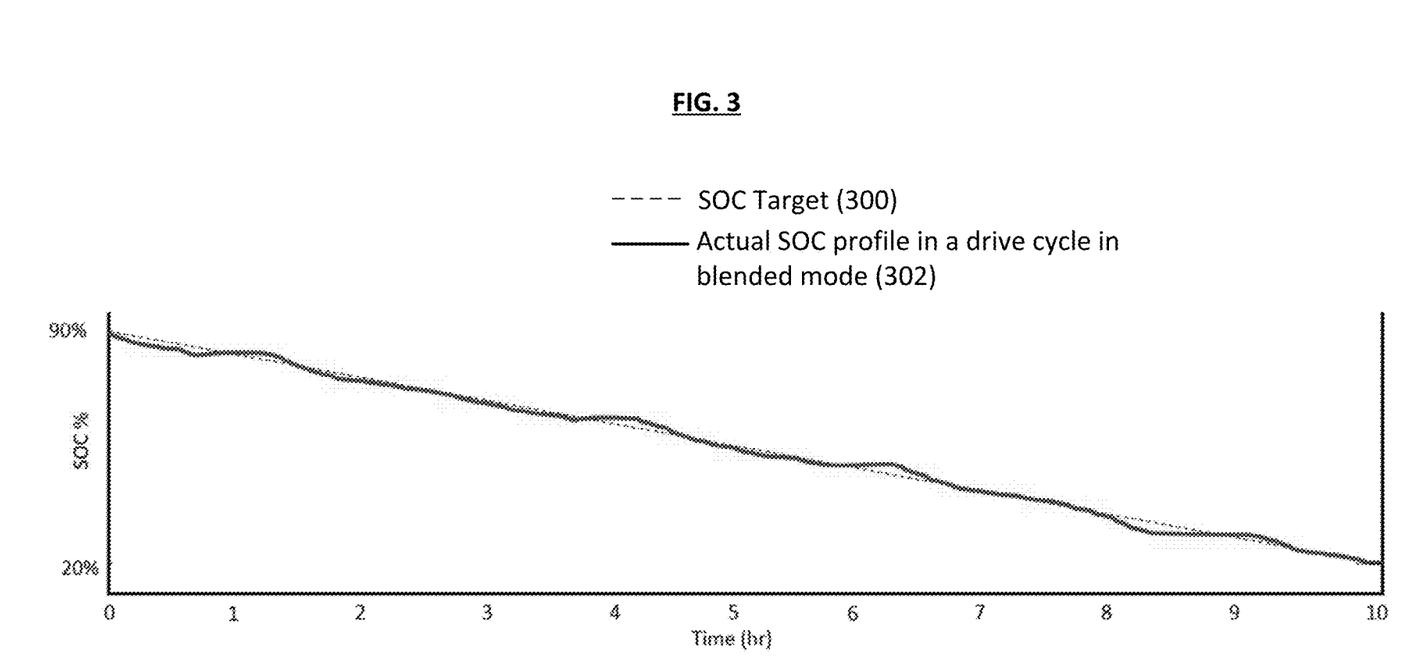
FIG. 3 is a graph comparing SOC target level and actual SOC profile in a drive cycle implementing a blended mode strategy according to some embodiments.

As examples, the trip distance is used to define a SOC target level 300 to achieve a blended mode operation 302 as shown in FIG. 3, which compares the SOC target level 300 of the blended mode, shown in a dotted line, with an actual SOC profile of the blended mode 302 in a driver cycle, shown in a solid line. The battery SOC feedback is used to increase or decrease battery usage to bring the SOC closer to the target level. The catalyst and battery temperatures are used to control engine and battery usage by updating PSR accordingly. For example, when the battery temperature is high, battery power is lowered and engine power is increased so that the battery is allowed to cool down to prevent derating. The onboard emission estimation can be used to optimize engine usage. For example, thermal management strategies can be employed when the estimated emissions exceed predefined thresholds. The geofencing zone information can indicate which areas require that the battery alone is used.

While various modules with particular functionality are shown in FIG. 2, it should be understood that the control system 109 and memory 202 may include any number of modules for completing the functions described herein. For example, the activities of multiple modules may be combined as a single module, as additional modules with additional functionality may be included, etc. Further, it should be understood that the control system 109 may further control other vehicle activity beyond the scope of the present disclosure.

Figure 4:
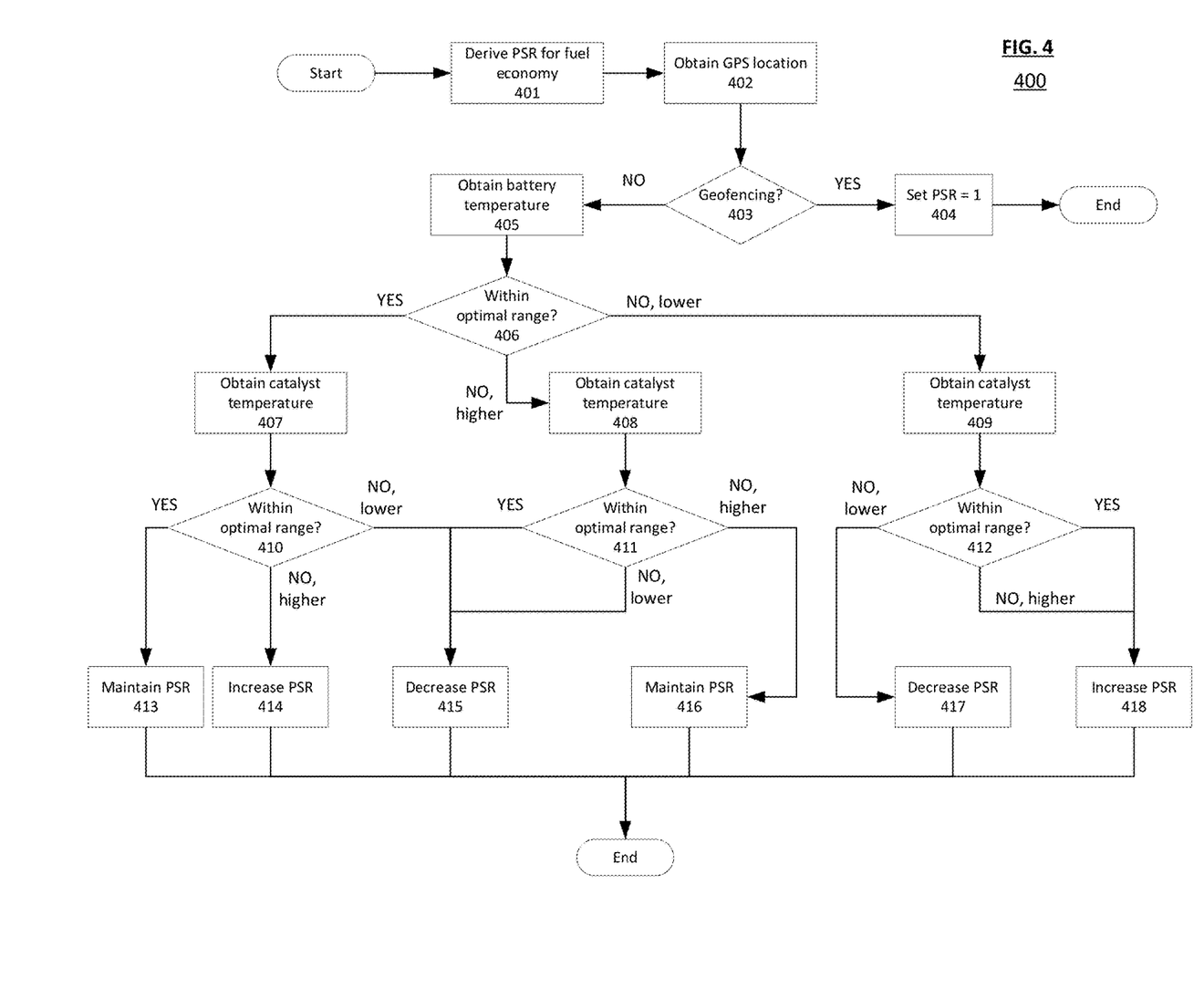
FIG. 4 is a flow chart of a method of determining power split ratio (PSR) values according to some embodiments.

FIG. 4 shows an example of a method 400 performed by the PSR strategy module 204 according to some embodiments. A PSR is defined as the ratio of the power to be provided by the motor-generator 106 to the total power demanded by the operator. Therefore, if only the motor-generator 106 is to provide power, the PSR would be 1, and if only the engine 101 is to meet all the power demand, the PSR would be 0. The PSR can be written as a function of various input data, such as:

$$PSR = f(DDP, SOC, T_{batt}, T_{AT}, Dist, EV_{req}, Emission)$$

where DDP is the driver demand power at wheels, SOC is the current state-of-charge of the battery, $T_{batt}$ is the temperature of the battery, $T_{AT}$ is the temperature of the aftertreatment system, Dist is the distance to be traveled, $EV_{req}$ is the all-electric vehicle requirement in which certain zones may require the vehicle to operate in all-electric mode without activating the engine, and Emission is the estimated emission level of the vehicle.

In the method 400, an initial PSR is derived in view of optimizing fuel economy of the vehicle 100 using any method that are known and existing in the industry; step 401. The PSR strategy module 204 then determines whether this initial PSR is to be changed, and if so, by how much, using the following steps. In some examples, the GPS location is obtained; step 402. The GPS location may indicate whether the vehicle 100 is in a geofenced location or any other areas with a certain emission level limit requirement, such as low-emission or zero-emission zones; step 403. For example, zero-emission zones only allow all-electric vehicles, in which case the PSR must be set to 1. Upon determining that the vehicle 100 is in the low-emission zone as indicated by the geofencing of the area, the algorithm may set the PSR to 1; step 404. Additionally, the GPS location can be used to calculate the distance to destination and update the PSR in-order to reach the desired target SOC.

Otherwise, when there is no geofencing, the PSR strategy module 204 proceeds to obtain the battery temperature; step 405. The battery temperature (e.g., battery temperature data 210) is obtained from the thermometer 113 coupled with the battery 107 as previously explained. The PSR strategy module 204 decides whether the battery temperature is within a predetermined optimal temperature range; step 406. If so, the catalyst temperature is obtained, per step 407. Note that the catalyst temperature is included in the catalyst and/or emission data 207 provided by the exhaust aftertreatment system 108 in some examples, as previously explained. Subsequently, the PSR strategy module 204 decides if the catalyst temperature is within the predetermined optimal range, per step 410. If the catalyst temperature is also within optimal range, the PSR is kept unchanged, in step 413. If the catalyst temperature is lower than the optimal range, the PSR is reduced to enable the exhaust aftertreatment system 108 to warm up, per step 415. If the catalyst temperature is higher, the PSR is increased to allow the catalyst temperature to cool down, in step 414. The PSR is modulated based on the rates at which the battery and catalyst temperatures change to ensure the temperatures of battery and catalyst would not reach thermal limits and frequency of performance derates is reduced.

If in step 406, the battery temperature is determined to be higher than the optimal range, the catalyst temperature is determined, in step 408. The catalyst temperature is checked to determine if the catalyst temperature is within the predetermined optimal range, in step 411. If the catalyst temperature is determined to be within or lower than optimal range, then the PSR is reduced to allow the battery temperature to cool down, as shown in step 415. If at step 411, the catalyst temperature is determined to be higher than the optimal range, then the PSR is maintained, as shown in step 416.

If in step 406, the battery temperature is determined to be lower than the optimal temperature threshold, the catalyst temperature is determined, in step 409. The catalyst temperature is checked to determine if the catalyst temperature is within the predetermined optimal range, in step 412. If the catalyst temperature is determined to be lower than the optimal range, then the PSR is reduced to warm up the exhaust aftertreatment system 108, per step 417. At this step, the warming up of the exhaust aftertreatment system is given priority over warming up of the battery, since the temperature of the exhaust aftertreatment system can directly affect the tail-pipe emissions. If the catalyst temperature is determined to be within the optimal range or higher than the optimal range, the PSR is increased to warm up the battery 107, prioritizing the warming up of the battery over cooling down of the catalyst, per step 418. Along with the optimal range, the rate of change of SOC and the rate of change of temperature are also used to calculate the PSR and/or the changes in the PSR.

Table 1 below summarizes the decisions regarding PSR in determining different values for the battery temperature and the catalyst temperature, based on the flow chart of FIG. 4. The increment value of PSR is calibrated based on the powertrain architecture and component sizes (battery size, types of aftertreatment being used, etc.). In some examples, the increment value at which the PSR changes may be greater for series hybrid architecture than parallel hybrid architecture.

TABLE 1

Decisions regarding PSR as determined based on whether the battery temperature and the catalyst temperature are within, lower than, or higher than the optimal range.

| | | Battery Temperature | | |
|---|---|---|---|---|
| | | Lower than optimal range | Within optimal range | Higher than optimal range |
| Catalyst Temperature | Lower than optimal range | Decrease PSR | Decrease PSR | Decrease PSR |
| | Within optimal range | Increase PSR | Maintain PSR | Decrease PSR |
| | Higher than optimal range | Increase PSR | Increase PSR | Maintain PSR |

Figure 5:
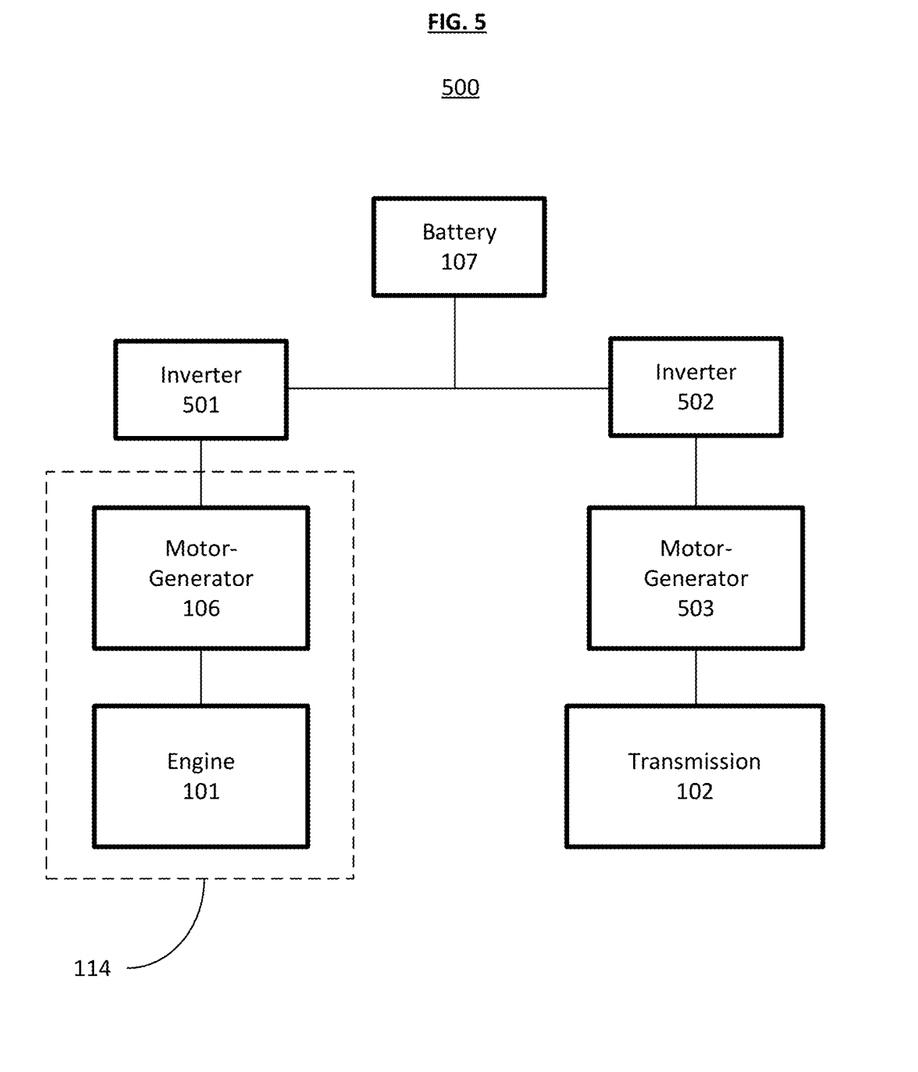
FIG. 5 is a partial schematic diagram of a hybrid vehicle according to some embodiments.

FIG. 5 shows an alternative partial design of a vehicle 500 that implements the PSR strategy module 204 as disclosed herein according to some embodiments. Some components from FIG. 1 such as the exhaust aftertreatment system 108, the control system 109, the operator input/output device 112, and the telematics unit 111 are omitted from this figure for simplicity, but it is understood that any additional components may be included as suitable for the purpose. The vehicle 500 includes two inverters 501 and 502 as well as two motor-generators 106 and 503. When the engine 101 is activated to provide mechanical energy for the motor-generator 106, the AC power generated by the motor-generator 106 is converted to DC power by the first inverter 501. The DC power can either be used to charge the battery 107 or be converted back to AC power through the second inverter 502. The second inverter 502 can then power the second motor-generator 503 to provide mechanical energy to operate the transmission 102, thereby moving the vehicle 500. The battery 107 can also provide DC power to the inverter 502 if the battery 107 has a sufficiently high SOC, in which case the engine 101 can be deactivated to reduce emission.

Controlling the PSR value based not only on meeting emission and fuel economy targets but also considering the states of the individual components in the hybrid vehicle system allows for emphasis to be placed on the life and state-of-health of the components such as the battery, motor-generator, engine, aftertreatment system, etc., without derating system performance. For example, an electrical power (P) to be supplied is calculated as shown below, where DDP is the driver demand power at the wheels, $\eta_{TM}$ is the efficiency of the transmission 102, and $\eta_{EM}$ is the efficiency of the electric motor of the motor-generator 503:

$$P = \frac{DDP}{\eta_{TM} * \eta_{EM}}$$

The electrical power provided by the battery 107 ($P_{batt}$) is calculated as follows: $P_{batt}$=PSR*P, and the electrical power provided by the genset 114 ($P_{genset}$) is calculated as follows: $P_{genset}$=(1−PSR)*P. The $P_{batt}$ value can be affected by the SOC and the temperature of the battery 107. The $P_{genset}$ value can be affected by the emission level and the aftertreatment temperature.

There is a plurality of different power split management strategies that impact the sizing of energy sources (engine and battery). For example, a "baseline" strategy as known in the art may use the charge-depleting (uses the battery for power) mode until the battery reaches a predetermined SOC and then use the charge-sustaining (use the genset for power) mode to maintain the battery SOC. A "blended mode" strategy uses both power sources in various ways. One type of such blended mode strategy involves dynamically adjusting the SOC target such that depletion of the battery is better controlled. The blended mode strategy which involves changing the PSR value as explained above is compared against baseline strategy.

Figure 6:
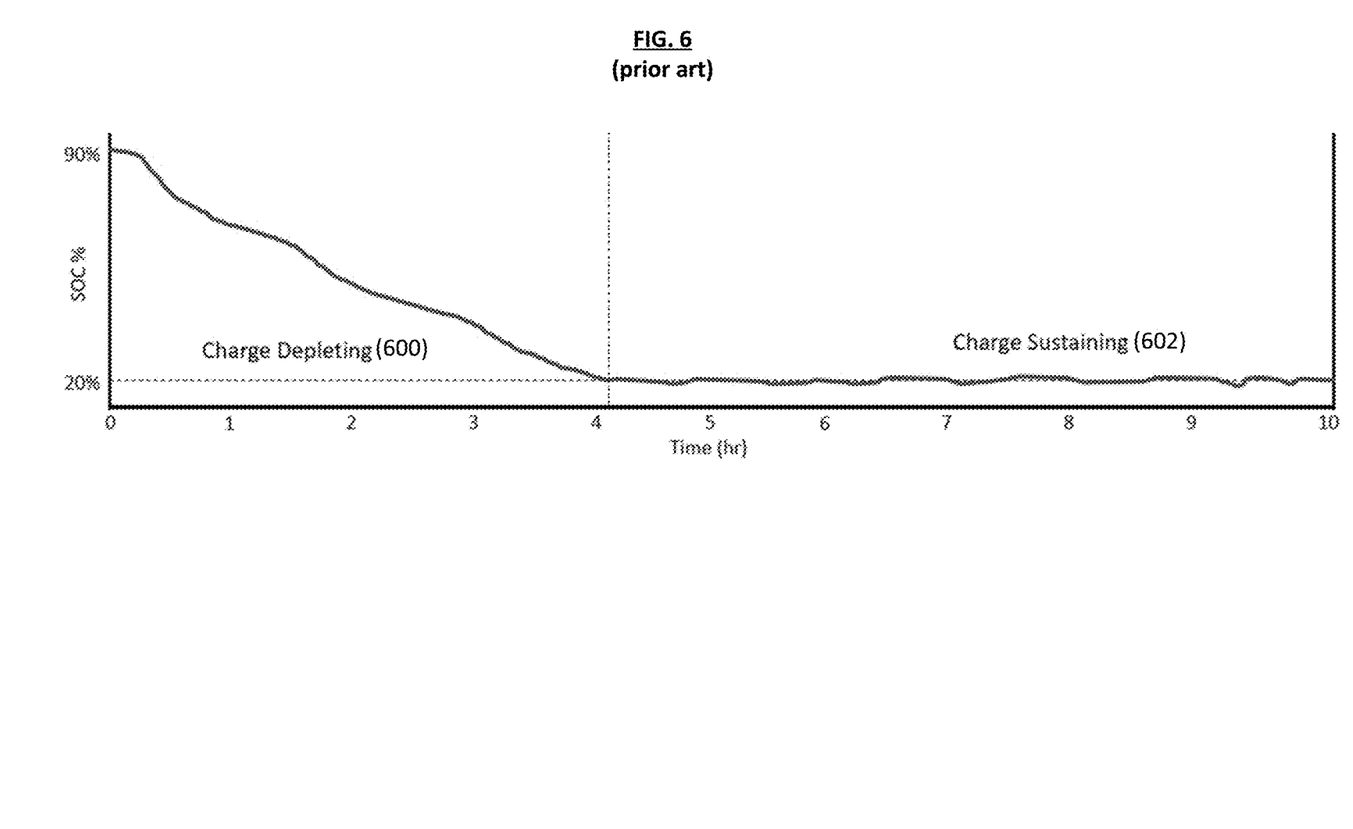
FIG. 6 is a graph of battery SOC trajectories in a baseline method as known in the art, which incorporates charge-depleting and charge-sustaining modes.

Table 2 below compares the two aforementioned strategies. FIGS. 3 and 6 show the difference between trajectories of the SOC curve when each strategy is applied. For example, the SOC curve of the blended mode (302 in FIG. 3) shows a steady decrease in the SOC from 90% to 20% during the 10 hours in which the vehicle is in operation, whereas the SOC curve of the charge-depleting-and-charge-sustaining mode (a.k.a. "baseline method" as represented by a charge depleting mode 600 and a charge sustaining mode 602 in FIG. 6) shows a steep decrease from 90% to 20% SOC in the first 4 hours in the charge depleting mode 600 during which the battery 107 is in operation, thereby depleting the SOC of the battery 107. Thereafter, the baseline method maintains 20% SOC in the battery 107 for the remainder of the 10-hour operation in the charge sustaining mode 602 by using the engine 101 to provide the power to drive the vehicle 100 instead of the battery 107. The baseline method 600, 602 is known in the art. When the SOC curves in the two different modes are compared, it is observed that the baseline method (600 and 602) of FIG. 6 shows the measured SOC curve in the charge depleting mode 600 decreasing at a much faster rate than the blended mode method 302 in FIG. 3 because the baseline method 600, 602 relies on depleting the battery until a certain threshold, after which the engine takes over to provide the power.

TABLE 2

Comparison of power management strategies in terms of fuel economy, battery life, and emission improvements

| Strategy | Fuel Economy improvement from baseline strategy | Battery life improvement from baseline strategy | Emission improvement from baseline |
|---|---|---|---|
| Charge depleting (600) and charge sustaining (602) | Baseline | Baseline | Baseline |
| Blended mode - Power split ratio (302) | 11.2% | 5% | 3% |

Table 2 above shows the resulting improvements in fuel economy, battery life, and emission after each of the blended mode 302 is implemented, when compared with the baseline method 600, 602. The blended mode method 302 improves not only the fuel economy but also the battery life and emissions. As such, the blended mode method 302 has the better overall system level performance when compared with the baseline method 600, 602. The aforementioned Table 2 and FIGS. 3 and 6 were obtained in simulation, using an electronic model (for example, a virtual computer model) of a class 5 vehicle weighing 19,500 lb. (approximately 8850 kg) and having a 2.8-liter natural gas engine, a range extender architecture with e-axle, and two compact batteries (39.5 kWh and 34.6 kWh).

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements. The scope is accordingly to be limited by nothing other than the appended claims, in which reference to an element in the singular is not intended to mean "one and only one" unless explicitly so stated, but rather "one or more."

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B or C may be present in a single embodiment; for example, A and B, A and C, B and C, or A and B and C.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic with the benefit of this disclosure in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. § 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of power management in a hybrid vehicle comprising an engine, a motor-generator, an aftertreatment system operatively coupled to the engine, a battery operatively coupled to the motor-generator, and a control system. the method comprising:
    obtaining, by the control system, battery temperature and catalyst temperature;
    determining, by the control system, (a) whether the battery temperature is within an optimal battery temperature range and (b) whether the catalyst temperature is within an optimal catalyst temperature range;
    incrementally changing by the control system, a power split ratio (PSR) that defines a ratio of a driver demand power that is to be provided by the motor-generator based on the determination of (a) and (b), and
    controlling, by the control system, the engine and the motor-generator based on the determined PSR.

2. The method of claim 1, wherein the incrementally changing the PSR includes: incrementally decreasing, by the control system, the PSR in response to the control system determining that the catalyst temperature is lower than the optimal catalyst temperature range.

3. The method of claim 2, wherein the incrementally decreasing in PSR is based on a rate at which the battery temperature or the catalyst temperatures changes.

4. The method of claim 1, wherein the incrementally changing the PSR includes: incrementally decreasing, by the control system, the PSR in response to the control system determining that the catalyst temperature is within or lower than the optimal catalyst temperature range and the battery temperature is higher than the optimal battery temperature range.

5. The method of claim 1, wherein the incrementally changing the PSR includes: incrementally increasing, by the control system, the PSR response to the control system determining that the battery temperature is lower than the optimal battery temperature range and the catalyst temperature is within or higher than the optimal catalyst temperature range.

6. The method of claim 1, wherein the incrementally changing the PSR includes incrementally increasing, by the control system, the PSR in response to the control system determining that the catalyst temperature is higher than the optimal catalyst temperature range and the battery temperature is within or lower than the optimal battery temperature range.

7. The method of claim 1, further comprising:
    obtaining, by the control system, geofencing data;
    determining, by the control system, whether the vehicle is in or approaching a lower emission zone based on the geofencing data; and
    setting, by the control system, the PSR at 1 in response to determining that the vehicle is in or approaching the lower-emission zone.

8. The method of claim 1, further comprising;
    obtaining, by the control system, lookahead data including current or forward route condition; and
    determining, by the control system, the PSR based o the lookahead data.

9. The method of claim 1, further comprising: maintaining, by the control system, the PSR in response to the control system determining that the catalyst temperature and the battery temperature are both within or higher than the respective optimal temperature ranges.

10. A hybrid vehicle system comprising:
    an engine, a motor-generator, an aftertreatment system operatively coupled to the engine, a battery operatively coupled to the motor-generator, and a control system configured to:
    obtain battery temperature and catalyst temperature;
    determine (a) whether the battery temperature is within an optimal battery temperature range and (b) whether the catalyst temperature is within an optimal catalyst temperature range;
    incrementally change a power split ratio (PSR) defining a ratio of a driver demand power that is to be provided by the motor-generator based on the determination of (a) and (b); and
    control the engine and the motor-generator based on the determined PSR.

11. The hybrid vehicle system of claim 10, wherein the control system incrementally changes the PSR by incrementally decreasing the PSR when the catalyst temperature is lower than the optimal catalyst temperature range.

12. The hybrid vehicle system of claim 11, wherein the control system incrementally changes the PSR by incrementally decreasing the PSR based on a rate at which the battery temperature or the catalyst temperatures changes.

13. The hybrid vehicle system of claim 10, wherein the control system incrementally changes the PSR by incrementally decreasing the. PSR when the catalyst temperature is within or lower than the optimal catalyst temperature range and the battery temperature is higher than the optimal battery temperature range.

14. The hybrid vehicle system of claim 10, wherein the control system incrementally changes the PSR by incrementally increasing the PSR when the battery temperature is lower than the optimal battery temperature range and the catalyst temperature is within or higher than the optimal catalyst temperature range.

15. The hybrid vehicle system of claim 11, wherein the control system incrementally changes the PSR by incrementally increasing the PSR when the catalyst temperature is higher than the optimal catalyst temperature range and the battery temperature is within or lower than the optimal battery temperature range.

16. The hybrid vehicle system of claim 10 further comprising a telematics unit, wherein the control system is further configured to:
obtain geofencing data from the telematics unit;
determine whether the vehicle is in or approaching a lower-emission zone based on the geofencing data; and
set the PSR at 1 when the vehicle is in or approaching the lower-emission zone.

17. The hybrid vehicle system of claim 10, further comprising a telematics unit, wherein the control system is further configured to:
obtain lookahead data including current or forward route condition from the telematics unit; and
determine the PSR based on the lookahead data.

18. A control system of a hybrid vehicle comprising an engine, a motor-generator, a battery operatively coupled to the motor-generator, and a control system configured to:
obtain battery temperature and catalyst temperature;
determine whether the battery temperature is within a predetermined optimal battery temperature range;
determine whether the catalyst temperature is within a predetermined optimal catalyst temperature range;
determine a rate of change of a state of charge (SOC) of the battery:
determine a power split ratio (PSR) based on the determination of the battery temperature, catalyst temperature, the rate of change of these temperatures, and the rate of change of the SOC of the battery; and
control the engine and the motor-generator based on the determined PSR.

19. A method of power management in a hybrid vehicle comprising an engine, a motor-generator, an aftertreatment system operatively coupled to the engine, a battery operatively coupled to the motor-generator, and a control system, the method comprising:
obtaining, by the control system, battery temperature and catalyst temperature;
determining, by the control system, (a) whether the battery temperature is within an
optimal battery temperature range and (b) whether the catalyst temperature is within an optimal catalyst temperature range;
determining, by the control system, a power split ratio (PSR) based on the determination of (a) and (b);
decreasing, by the control system, the PSR in response to the control system determining that the catalyst temperature is lower than the optimal catalyst temperature range and based on a rate at which the battery temperature or the catalyst temperatures changes; and
controlling, by the control system, the engine and the motor-generator based on the determined PSR.

20. A method of power management in a hybrid vehicle comprising an engine, a motor-generator, an aftertreatment system operatively coupled to the engine, a battery operatively coupled to the motor-generator, and a control system, the method comprising:
obtaining, by the control system, battery temperature, catalyst temperature, and geofencing data;
determining, by the control system, (a) whether the battery temperature is within an optimal battery temperature range, (b) whether the catalyst temperature is within an optimal catalyst temperature range, and (c) whether the vehicle is in or approaching a lower-emission zone based on the geofencing data;
determining, by the control system, a power split ratio (PSR) based sot the determination of (a) and (b);
setting, by the control system, the PSR at 1 in response to determining that the vehicle is in or approaching the lower-emission zone; and
controlling, by the control system, the engine and the motor-generator based on the determined PSR.

21. A method of power management in a hybrid vehicle comprising an engine, a motor-generator, an aftertreatment system operatively coupled to the engine, a battery operatively coupled to the motor-generator, and a control system, the method comprising:
obtaining, by the control system, battery temperature, catalyst temperature, and lookahead data including current or forward route condition;
determining, by the control system, (a) whether the battery temperature is within an optimal battery temperature range and (b) whether the catalyst temperature is within an optimal catalyst temperature range;
determining, by the control system, a power split ratio (PSR) based on the lookahead data and the determination of (a) and (b); and
controlling, by the control system, the engine and the motor-generator based on the determined PSR.

22. A method of power management in a hybrid vehicle comprising an engine, a motor-generator, an aftertreatment system operatively coupled to the engine, a battery operatively coupled to the motor-generator, and a control system, the method comprising:
obtaining, by the control system, battery temperature and catalyst temperature;
determining, by the control system, (a) whether the battery temperature is within an optimal battery temperature range and (b) whether the catalyst temperature is within an optimal catalyst temperature range;
determining, by the control system, a power split ratio (PSR) based on the determination of (a) and (b);
maintaining, by the control system, the PSR in response to the control system determining that the catalyst temperature and the battery temperature are both within or higher than the respective optimal temperature ranges; and
controlling, by the control system, the engine and the motor-generator based on the determined PSR.

23. A hybrid vehicle system comprising:
an engine, a motor-generator, an aftertreatment system operatively coupled to the engine, a battery operatively coupled to the motor-generator, and a control system configured to perform the method of claim 19.

24. A hybrid vehicle system comprising:
an engine, a motor-generator, an aftertreatment system operatively coupled to the engine, a battery operatively coupled to the motor-generator, a telematics unit, and a control system configured to perform the method of claim 20.

25. A hybrid vehicle system comprising:

an engine, a motor-generator, an aftertreatment system operatively coupled to the engine, a battery operatively coupled to the motor-generator, a telematics unit, and a control system configured to perform the method of claim 21.

\* \* \* \* \*